Patented Apr. 16, 1935

1,997,918

UNITED STATES PATENT OFFICE 1,997,918

AGENT FOR DESTROYING RUST ON CULTIVATED PLANTS AND PROCESS OF PREPARING THIS AGENT

Adolf Steindorff, Robert Krämer, Wilhelm Staudermann, and Michael Erlenbach, Frankfort-on-the-Main, Germany, assignors to Winthrop Chemical Company, Inc., New York, N. Y., a corporation of New York No Drawing. Application December 5, 1933, Serial No. 701,086. In Germany May 11, 1931

4 Claims. (Cl. 167—22)

The present invention relates to agents for destroying rust on cultivated plants and to a process of preparing these agents.

It is already known that the amides of aromatic sulfonic acids are suitable weed killing agents with the aid of which promenades, places or other pieces of ground overgrown with weeds can be freed from weeds by spraying or sprinkling them. The sprayed or sprinkled plants are destroyed thereby or when the ground is already free from weeds these will grow on the sprinkled parts.

We have now found that the amides of aromatic sulfonic acids or the substitution products or derivatives thereof, in a suitable dilution, can advantageously be used for combating vegetable parasites, particularly fungi causing rust without injuring the vegetation.

In order to preserve the plants from becoming rusty or in order to prevent the rust from spreading further the agricultural cultivated plants, such as wheat, rye, oat or asparagus or horticultural cultivated plants, such as sunflowers, celery, beans, roses or chrysanthemums which as regards their productivity and appearance have suffered badly from rust may, for instance, be sprayed once or several times with a product consisting of 7 parts of para-toluene-sulfamide or the same quantity of the sodium salt of para-toluene-sulfamide and 93 parts of talc or another inert extender. In the same manner there may be used other amides of aromatic sulfonic acids, such as benzene-sulfamide, xylene-sulfamide, dichloro-benzene-sulfamide. If desired, instead of an indifferent extender in the mixture to be spread there may be used in complete or partial substitution substances having a fertilizing action, for instance, Thomas slag or other fertilizers containing phosphorus, potassium salts or products containing nitrogen or mixtures of these fertilizing substances.

It has already been proposed to use halogenated acid amides or acid imides as seed dressing agents. This dressing of the seed has, however, no action on the rust, as investigations have shown. Contrary thereto, the agents prepared in accordance with the present invention are extremely active against rust when they are sprayed or applied on the soil, as results from the following tests for combating a species of blight of wheat known by the latin name "puccinia":

1. Mixture of ortho- and para-toluene-sulfamide applied on the soil

| Mg. per square meter | Number of pustules of "puccinia" per seed plant |
|---|---|
| 250 | 28 |
| 500 | 12 |
| 750 | 5 |
| 1000 | 5 |
| 1250 | 2 |
| 1500 | 0 |
| Verifying test (non-treated soil). | 28 |

2. Ortho-toluene-sulfamide

| Mg. per square meter | Number of pustules of "puccinia" per seed plant |
|---|---|
| 250 | 5 |
| 500 | 0.5 |
| 750 | 0 |
| Verifying test (non-treated soil). | 28 |

3. Sodium nitrate, in quantities of
   4 grs. of nitrogen per square meter + 1250 mg. of ortho- and para-toluene-sulfamide per square meter, number of pustules per seed plant: 1;
   4 grs. of nitrogen per square meter + 1250 mg. of ortho- toluene-sulfamide per square meter, number of pustules per seed plant: 0;
Verifying test: sodium nitrate without the addition of toluene-sulfamide number of pustules per seed plant: 34.

We claim:
1. Agents for destroying rust containing an amide of an aromatic sulfonic acid.
2. Agents for destroying rust containing an amide of a sulfonic acid of the benzene series.
3. An agent for destroying rust containing a mixture of ortho- and para-toluene-sulfamide.
4. An agent for destroying rust containing ortho-toluene-sulfamide.

ADOLF STEINDORFF.
ROBERT KRÄMER.
WILHELM STAUDERMANN.
MICHAEL ERLENBACH.